(12) United States Patent
Tanahara

(10) Patent No.: US 8,045,074 B2
(45) Date of Patent: Oct. 25, 2011

(54) ARRAY SUBSTRATE AND DISPLAY DEVICE

(75) Inventor: Manabu Tanahara, Tokyo (JP)

(73) Assignee: Mitsubishi Electric Corporation (JP)

( * ) Notice: Subject to any disclaimer, the term of this patent is extended or adjusted under 35 U.S.C. 154(b) by 430 days.

(21) Appl. No.: 12/365,406

(22) Filed: Feb. 4, 2009

(65) Prior Publication Data

US 2009/0195721 A1    Aug. 6, 2009

(30) Foreign Application Priority Data

Feb. 6, 2008    (JP) .................................. P2008-026319

(51) Int. Cl.
  *G02F 1/1333*    (2006.01)
  *G02F 1/1343*    (2006.01)

(52) U.S. Cl. ................. 349/39; 349/38; 349/40; 349/42; 349/141; 349/146

(58) Field of Classification Search .............. 349/38–42, 349/141–146
  See application file for complete search history.

(56) References Cited

U.S. PATENT DOCUMENTS

| | | | |
|---|---|---|---|
| 7,227,607 B2 * | 6/2007 | Lee ............................... | 349/141 |
| 7,339,645 B2 * | 3/2008 | Lee ............................... | 349/141 |
| 7,528,920 B2 * | 5/2009 | Lee et al. ...................... | 349/141 |
| 2008/0204613 A1 * | 8/2008 | Kim et al. ..................... | 349/33 |

FOREIGN PATENT DOCUMENTS

| | | |
|---|---|---|
| JP | 2006-276359 | 10/2006 |
| JP | 2006-276360 | 10/2006 |
| JP | 2006-276361 | 10/2006 |

OTHER PUBLICATIONS

U.S. Appl. No. 12/646,200, filed Dec. 23, 2009, Tanahara.

\* cited by examiner

*Primary Examiner* — Huyen Ngo

(74) *Attorney, Agent, or Firm* — Studebaker & Brackett PC; Donald R. Studebaker

(57) ABSTRACT

In the array substrate where the display region has the non-quadrangle shape, a sub-capacitance line which forms a sub-capacitance is disposed at the pixel, a intersection region of the scanning lead-out line and a signal lead-out line is located at the frame region on the outside of the display region, a common lead-out line which connects the sub-capacitance line in common is disposed at the frame region side where the scanning lead-out line is disposed, the common lead-out line is not disposed in the intersection region, but disposed in a region between a region of the scanning lead-out line and a region of the signal lead-out line while intersecting any one of the scanning lead-out line and the signal lead-out line.

3 Claims, 6 Drawing Sheets

ARRAY SUBSTRATE AND DISPLAY DEVICE

This application claims priority from Japanese Patent Application No. 2008-026319 filed on Feb. 6, 2008, the entire subject matter of which is incorporated herein by reference.

BACKGROUND OF THE INVENTION

1. Field of the Invention

The present invention relates to an array substrate and a display device, and more particularly, to an array substrate and a display device which include a display region having a non-quadrangle shape such as circle, ellipse, polygon (except quadrangle) or the like instead of a general quadrangle shape (square, rectangle).

2. Description of the Related Art

In recent years, the display device has been used as an information transferring means adapted in various apparatus for people. As an existing typical thin display device, an active matrix liquid crystal display device using an array substrate formed with a thin film transistor (TFT) becomes a mainstream, which has an excellent characteristic in display quality level, small thickness, light weight and power consumption.

In recent years, as the thin display device becomes a mainstream, products are required of various functions and shapes. Accordingly, there has been a request for a thin display device which has various non-quadrangle shapes of a display region, such as, circle, ellipse, polygon (except quadrangle) or the like instead of a quadrangle shape like a square or a rectangle.

As a display device having the above-mentioned request, for example, there are a cell-phone display device and a car-mounted display device. For example, liquid crystal display devices having these non-quadrangle display regions are disclosed in JP-A-2006-276359 (FIGS. 1 and 2), JP-A-2006-276360 (FIGS. 1, 2, and 13), and JP-A-2006-276361 (FIGS. 1, 2, and 12).

However, in the liquid crystal display device disclosed in JP-A-2006-276359, even though there is a description of scanning lead-out lines and signal lead-out lines disposed in a frame region on the outside of the display region along the shape of the display region, there is no detailed description of a sub-capacitance Cs for holding a voltage applied to the liquid crystal which is generally provided in the liquid crystal display device or sub-capacitance lines for forming the sub-capacitance Cs, and there is no detailed description of a layout of a common lead-out line for commonly connecting the sub-capacitance lines in the frame region.

Further, in a liquid crystal display device disclosed in JP-A-2006-276360, even though the sub-capacitance is provided, it adopts the Cs-on-Gate type where the sub-capacitance Cs is formed by being overlapped with the scanning line. However, in the current liquid crystal display device, the Cs-on-Common type is a mainstream where the sub-capacitance line is separated with and disposed along the scanning line or the signal line. Moreover, there is no detailed description of a configuration adopting the Cs-on-Common type for the liquid crystal display device having the non-quadrangle display region.

Further, in the liquid crystal display device disclosed in JP-A-2006-276361, it also adopts the Cs-on-Gate type where the sub-capacitance Cs is formed by being overlapped with the scanning line. FIG. 12 shows the use of the Cs-on-Common type as a related art, and the liquid crystal display device having an elliptic display region is illustrated. However, it is described that a line Zn (sub-capacitance line) connected to a sub-capacitance electrode may give rise to disconnection of the line or short-circuiting between the lines. Further, it is illustrated, for example, that the line Zn is connected to the outermost line Z (common lead-out line) in a frame region lower left of the elliptic display region, and the line Zn intersects the both lead-out lines of a scanning line X1 (scanning lead-out line) and a signal line Y1 (signal lead-out line) located at the frame region. However, there is no detailed description that the line Zn is connected to the line Z by using what kind of layered structure.

SUMMARY

The present invention is made in order to solve the above-mentioned problems, and an object of the invention is to provide an array substrate of the Cs-on-Common type (sub-capacitance common line type) where the display region has a non-quadrangle shape, and a display device using the array substrate.

Further, another object of the present invention is to decrease contact resistance of a converting portion for connecting the sub-capacitance line and a common lead-out line which commonly connects the sub-capacitance line in the frame region on the outside of the display region, and to decrease display variation due to deviations in a common potential of the sub-capacitance line.

According to an aspect of the present invention, there is provided an array substrate comprising pixels which are configured on a substrate, each pixel including: a scanning line; a signal line which intersects the scanning line; a thin film transistor which is connected to the scanning line and the signal line in a region surrounded by these lines; a pixel electrode which is connected to the thin film transistor; and a sub-capacitance line which forms a sub-capacitance, wherein a display region, where a plurality of the pixels is disposed in a matrix-like shape, has a non-quadrangle shape, wherein a frame region on the outside of a display region includes: an intersection region of the scanning lead-out line and the signal lead-out line; a scanning lead-out line connected to the scanning line; a signal lead-out line connected to the signal line; and a common lead-out line which connects the sub-capacitance line in common to a side of a frame region where the scanning lead-out line is disposed, and wherein the common lead-out line is not disposed in the intersection region of the frame region, but disposed in a region between a region of the scanning lead-out line and a region of the signal lead-out line, while intersecting any one of the scanning lead-out line and the signal lead-out line.

According to another aspect of the present invention, there is provided an array substrate comprising pixels which are configured on a substrate, each pixel including: a scanning line; a signal line which intersects the scanning line; a thin film transistor which is connected to the scanning line and the signal line in a region surrounded by these lines; a pixel electrode which is connected to the thin film transistor; and a sub-capacitance line which forms a sub-capacitance, wherein a display region, where a plurality of the pixels is disposed in a matrix-like shape, has a non-quadrangle shape, wherein a frame region on the outside of a display region includes: an intersection region of the scanning lead-out line and the signal lead-out line; a scanning lead-out line connected to the scanning line; a signal lead-out line connected to the signal line; and a common lead-out line which connects the sub-capacitance line in common to a frame region where the scanning lead-out line is disposed, wherein the common lead-out line is not disposed in the intersection region of the frame region, but disposed at a region nearer to the end of the substrate than the region of the scanning lead-out line and the region of the signal lead-out line, and wherein a connection line which connects the sub-capacitance line and the common lead-out line is made of a layer different from a layer of the intersecting lead-out line, and is disposed via an insulating film.

According to the present invention, it is possible to obtain an array substrate of the sub-capacitance common line type where a display region has a non-quadrangle shape, and a display device using the array substrate. Further, it is possible to obtain the array substrate and the display device without increasing the number of manufacturing processes.

It is also possible to decrease a contact resistance of a converting portion for connecting a sub-capacitance line and a common lead-out line in a frame region on the outside of the display region, and to decrease display variation due to deviations in a common potential of the sub-capacitance line.

DETAILED DESCRIPTION OF THE PREFERRED EMBODIMENTS

Hereinafter, an array substrate and a display device according to embodiments of the present invention will be described with reference to the drawings. Further, since the same sign indicates the same or corresponding part, the redundant description thereof will be omitted in each drawing for illustrating the embodiments below. Further, the drawings illustrate a configuration in brief, so that the actual shape or dimension may be slightly different.

Embodiment 1

Figure 1:
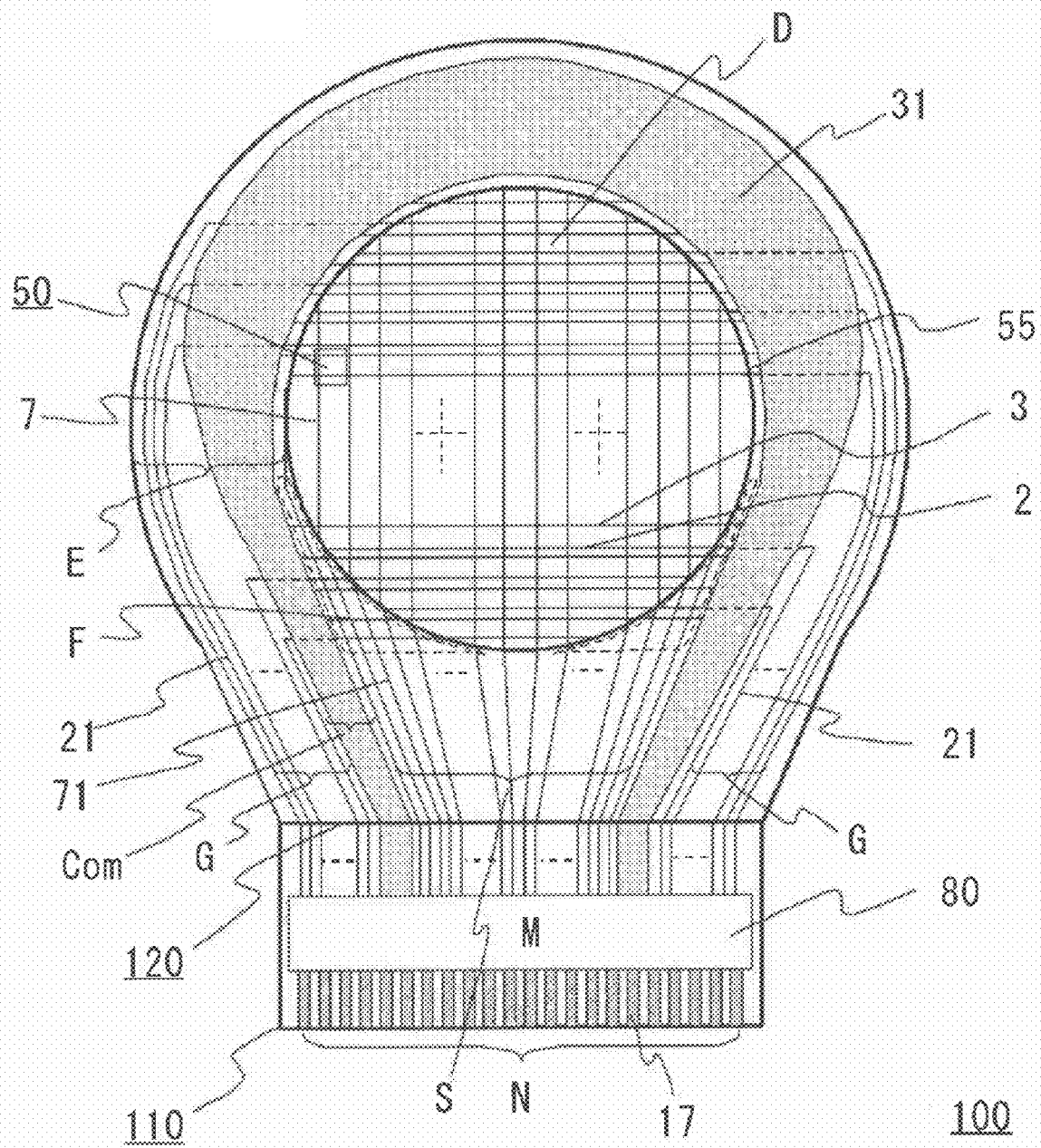
FIG. 1 is a plan view schematically illustrating a configuration of a display device according to Embodiment 1 of the present invention.
Figure 2:
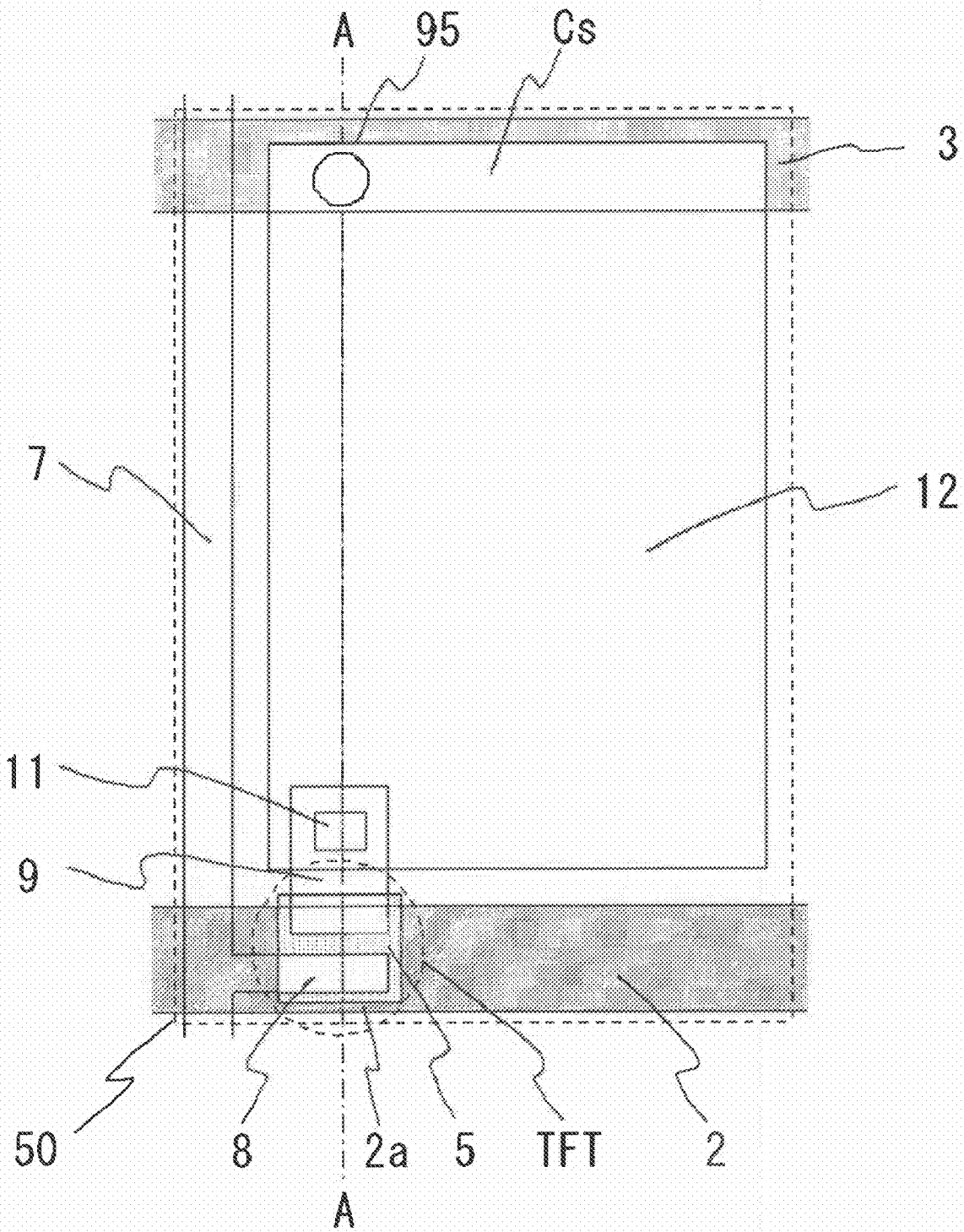
FIG. 2 is an enlarged plan view illustrating one pixel which configures a display region according to Embodiment 1 of the present invention.
Figure 3:
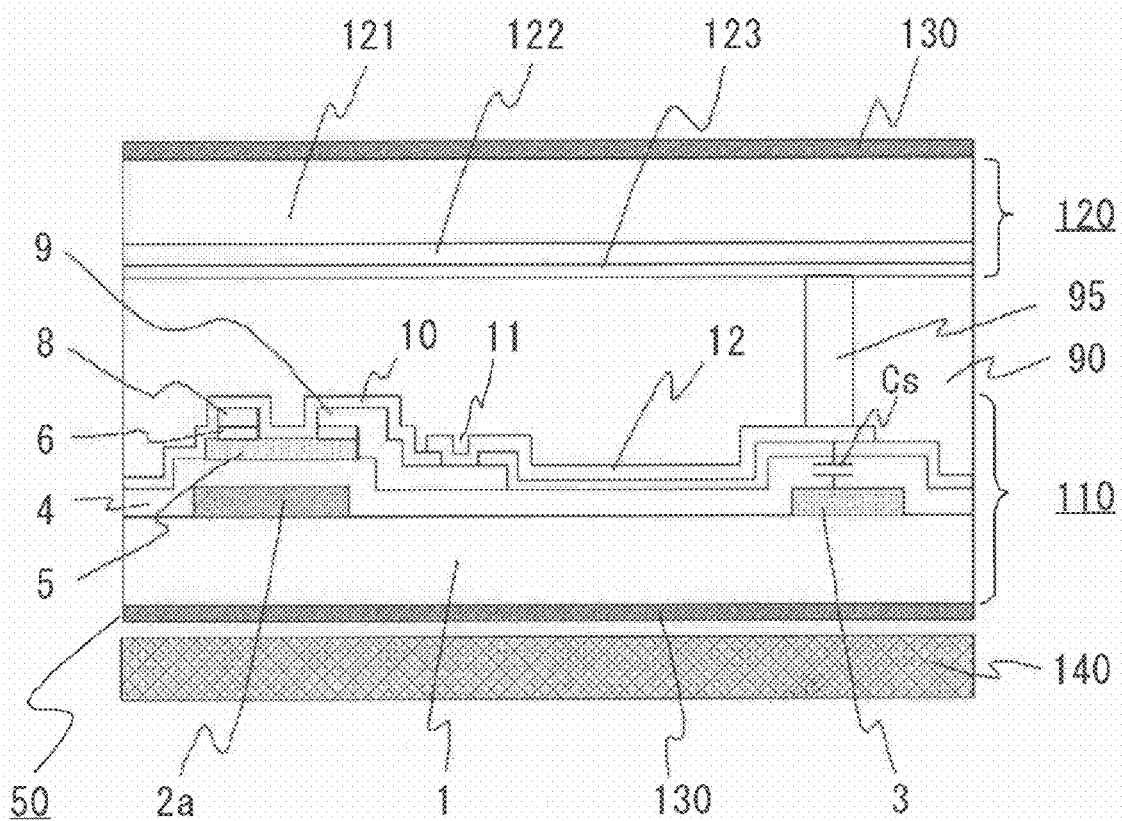
FIG. 3 is a cross-sectional view taken along line A-A of FIG. 2.

FIG. 1 is a plan view schematically illustrating a configuration of a display device according to Embodiment 1 of the present invention. FIG. 2 is an enlarged plan view illustrating one pixel which forms a display region of the display device shown in FIG. 1. FIG. 3 is a cross-sectional view taken along line A-A of FIG. 2.

Referring to FIG. 1, a liquid crystal display device 100 is configured such that a pixel 50 is formed in a region surrounded by a scanning line 2 and a signal line 7 which intersects the scanning line 2. An array substrate 110 having a non-quadrangle display region D where plural pixels 50 are disposed in a matrix-like shape is bonded to an opposing substrate 120 disposed opposite to the array substrate 110 by the use of a seal material with a spacing therebetween by a spacer. A liquid crystal is enclosed in the spacing. Further, as it is described below, in a transmission type liquid crystal display device 100, a backlight is disposed on the rear surface of the array substrate 110, and a polarizing plate is attached on the outside of the array substrate 110 and the opposing substrate 120.

In Embodiment 1, the shape of display region boundary 55 of the display region D is circular. The pixel 50 includes a TFT which is connected to the scanning line 2 and the signal line 7 and a pixel electrode and the like, and a sub-capacitance line 3 for holding a voltage applied to the liquid crystal is disposed along the scanning line 2 or the signal line 7. Here, the sub-capacitance line 3 is separated with and disposed along the scanning line 2.

Further, in a frame region E on the outside of the display region D, a region G of a scanning lead-out line 21 connected to the scanning line 2, a region S of a signal lead-out line 71 connected to the signal line 7, and a region Com of a common lead-out line 31 connecting the sub-capacitance line 3 in common are disposed.

In Embodiment 1, the scanning lines 2 extending to a horizontal (row) direction are alternately inputted from the right and left of the display region D.

Further, both ends of the sub-capacitance line 3 extending to the horizontal (row) direction are connected to the common lead-out line 31. The common lead-out line 31 is disposed so as to surround the display region D.

Further, in the liquid crystal display device shown in FIG. 1, a mounting region M and a connection terminal region N are collectively disposed in one end of the array substrate 110, and a driver IC which is a driving circuit 80 capable of driving both of the scanning line 2 and the signal line 7 is mounted on the array substrate 110 by a COG (Chip on Glass) mount technique.

In the connection terminal region N at the lower end of the array substrate 110, connection terminals 17 are arranged in columns which are used for connecting a flexible substrate to be connected with an external circuit.

The driving circuits 80 which drive the scanning line 2 and the signal line 7 may be respectively configured or the respective driving circuits may be mounted on different positions on the frame region E of the array substrate 110. Further, the driving circuit is not limited by the COG mounted circuit, and may be a polysilicon TFT circuit formed on the array substrate 110 by the TAB (Tape Automated Bonding) mounted circuit.

In addition, in Embodiment 1, even though the display region D is circular, it may be any shape of ellipse, polygon (except quadrangle) or the like. A region surrounded by the scanning line 2 and the signal line 7 forms the pixel 50 (the shape of the pixel is not limited to a quadrangle shape), and the display region D may be formed by disposing the plural pixels 50 in a matrix-like shape.

When the display region D has a non-quadrangle shape, in a portion of the frame region E, there is an intersection region F where the scanning lead-out line 21 intersects the signal lead-out line 71. The number of the intersecting portions depends on that of the rows (horizontal) or the columns (vertical) of the scanning line 2 or the signal line 7. In addition, the position or the shape of the intersection region F depends on a pattern of the scanning lead-out line 21 and the signal lead-out line 71 or a position of the mounting region M or the like.

The shape of the display region D of the conventional display device is generally a quadrangle shape, where the number of the pixels in the row (horizontal) or the column (vertical) is equal for scanning lines 2 or signal lines 7 and there is no case where the number of the pixels is different from each other in the row (horizontal) or the column (vertical). Also, in the frame region E, the intersection region F of the scanning lead-out line 21 and the signal lead-out line 71 has some intersecting portions of dummy scanning lines and dummy signal lines which are used for dummy pixels provided in the frame region E on the outside of the display region D, so that the intersection region F has a small area of a quadrangle shape. Therefore, similar to the intersection region F in the frame region E of the display region D in the non-quadrangle shape, there is no case where the number of the intersecting portions is different from each other in the row (horizontal) or the column (vertical) of the scanning line 2 or the signal line 7.

Next, the details of a planar configuration and a cross-sectional configuration of the pixel 50 shown in FIG. 1 and a method of manufacturing the liquid crystal display device 100 will be described with reference to FIGS. 2 and 3. In addition, the description of the manufacturing method will be made by using a general 5-mask process, but not limited thereto.

First, using a sputtering method or the like, a first conductive film such as Al, Cu, Mo, Ta, Ti, Cr, ITO or the like is formed on a substrate 1 made of a transparent material such as glass, so that the scanning line 2, a gate electrode 2a, the scanning lead-out line 21, the sub-capacitance line 3, and the connection terminal 17 and the like are formed in a predetermined pattern.

Next, using the plasma CVD or the like, a gate insulating film 4, a semiconductor active film 5, and an ohmic contact film 6 which are made of an oxide film or a nitride film are sequentially formed, so that the semiconductor active film 5 and the ohmic contact film 6 are formed according to a predetermined pattern which becomes a part of the TFT.

Next, using the sputtering method or the like, a second conductive film such as Al, Cu, Mo, Ta, Ti, Cr, ITO or the like is formed, so that the signal line 7, a source electrode 8 and a drain electrode 9 of the TFT, the signal lead-out line 71 and the like are formed in a predetermined pattern. Thereafter, the ohmic contact film 6 on a channel portion between the source electrode 8 and the drain electrode 9 of the TFT is removed, so that an inversely-staggered TFT is formed.

Next, an oxide film, a nitride film, an organic resin film, or a protective film 10 which is made by laminating these films are formed. Then, a contact hole 11 is formed on the drain electrode 9. At this time, as described hereinafter, a contact hole is also formed on a contact hole for the common lead-out line 31, a connection terminal for the COG mount of the mounting region M, or the connection terminal 17 of the connection terminal region N, such that the first conductive film or the second conductive film is exposed.

Next, a pixel electrode 12 is formed on the protective film 10. The pixel electrode 12 is made of a transparent conductive film such as ITO when it is a transmission type, or a high reflectivity conductive film such as Al and Ag when it is a reflective type. The pixel electrode 12 is connected to the drain electrode 9 via the contact hole 11. In addition, a region where the pixel electrode 12 overlaps with the sub-capacitance line 3 configures a sub-capacitance Cs for holding a voltage of a liquid crystal 90.

Further, the semiconductor active film 5 and the ohmic contact film 6 also can be disposed in a region other than the TFT region. For example, the semiconductor active film 5 and the ohmic contact film 6 are also disposed at the intersecting portions where the scanning line 2 and the sub-capacitance line 3 are intersected with the signal line 7. In this way, the semiconductor active film 5 and the ohmic contact film 6 are also disposed at the intersecting portion of the first conductive film and the second conductive film, so that the short-circuiting between lines due to coating defect in the gate insulating film 4 is able to be suppressed.

As shown in the cross-sectional view of FIG. 3, an opposing substrate 120 is bonded to the array substrate 110 with an interval of 1 to several μm therebetween through a resin spacer 95 and the liquid crystal 90 is enclosed in the interval, so as to form a liquid crystal panel. The opposing substrate 120 is configured such that a color material 122 made of the three primary colors (for example, red, green, and blue) for displaying colors, an opposing electrode 123 made of a transparent conductive film such as ITO to be a common potential (reference potential), and a black mask (not shown) made of a material such as Cr, Cr oxide, and black resin in order to shield light leakage which is unnecessary for the pixel 50 are formed on a transparent substrate 121 which is made of glass or the like while opposing to the array substrate 110, which are formed as the opposing substrate 120.

Further, on the outermost surface at the liquid crystal 90 side of the array substrate 110 and the opposing substrate 120, an alignment film (not shown) is formed to control an orientation of molecules in the liquid crystal 90. In addition, since the opposing electrode 120 is formed at the array substrate 110 side in the In-Plane Switching (IPS) mode liquid crystal display device 100, there is no alignment film on the opposing substrate 120.

On the outer surface of the array substrate 110 and the opposing substrate 120, a polarizing plate 130 is attached. Further, in a case of the transmission type, the liquid crystal display device 100 is formed by disposing a backlight 140 on the rear surface of the array substrate 110.

Figure 4:
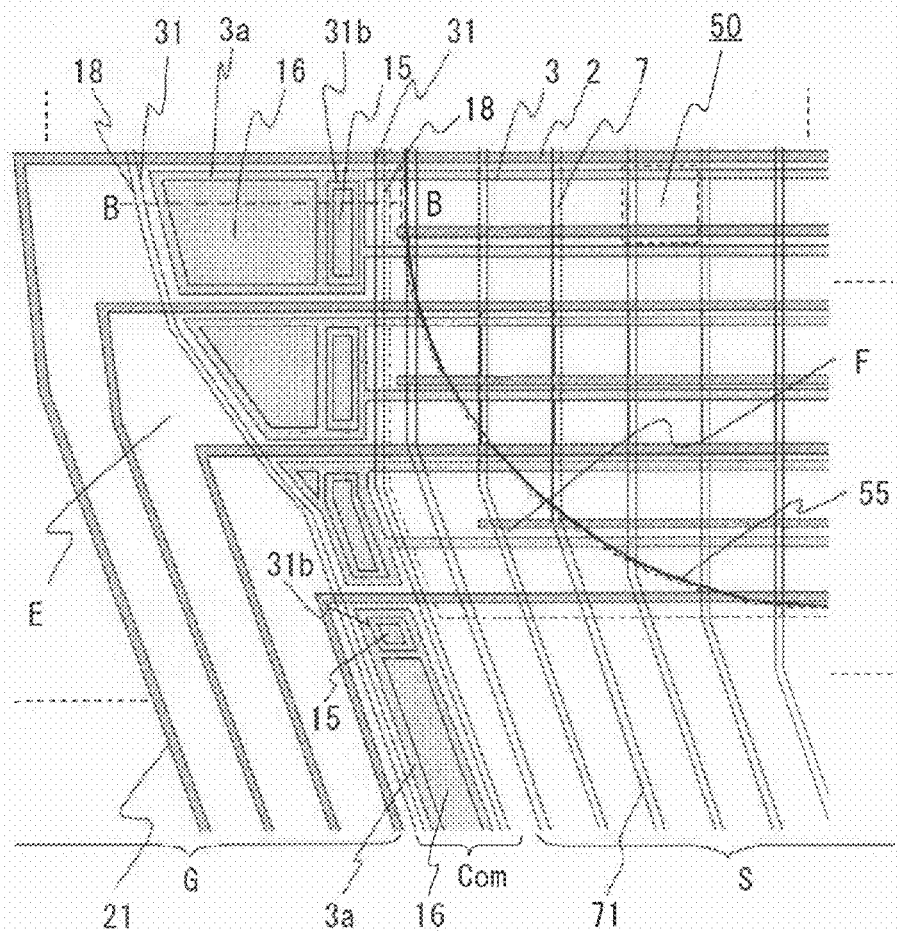
FIG. 4 is an enlarged plan view illustrating a frame region in an array substrate of a liquid crystal display device according to Embodiment 1 of the present invention.
Figure 5:
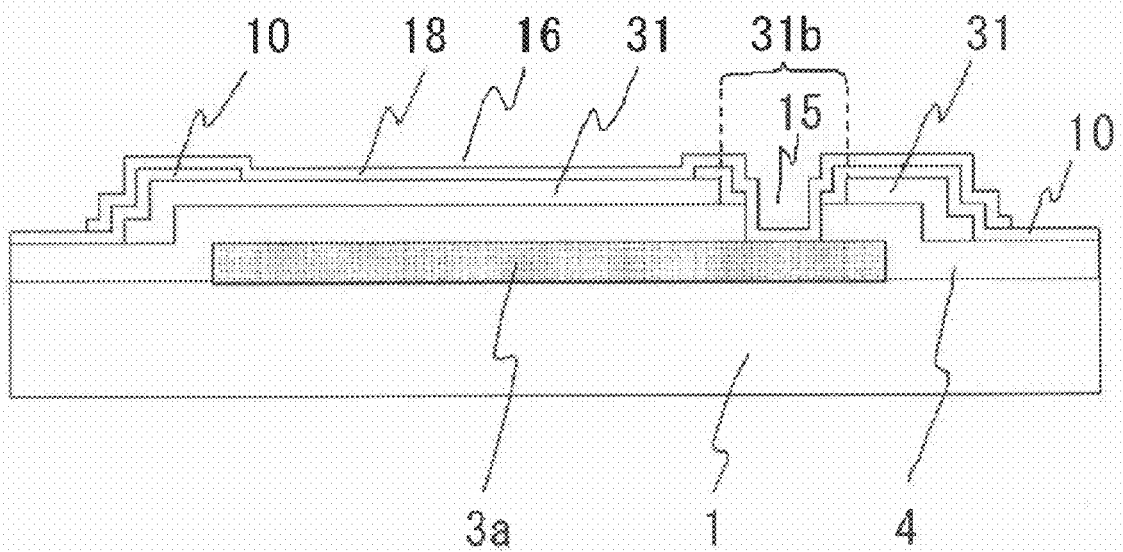
FIG. 5 is a cross-sectional view taken along line B-B of FIG. 4.

Next, the details and effects of a configuration of the common lead-out line 31 as an essential portion of the present invention will be described. FIG. 4 is an enlarged plan view illustrating a lower left region of the frame region E in the array substrate 100 shown in FIG. 1. FIG. 5 is a cross-sectional view taken along line B-B of FIG. 4. Further, the TFT, the pixel electrode 12 and the like are omitted in the pixel 50 of the display region D shown in FIG. 4 to simplify the drawing.

As shown in FIGS. 4 and 5, the common lead-out line 31 is disposed in the frame region E so as not to overlap with the intersection region F which includes the intersecting portion of the scanning lead-out line 21 and the signal lead-out line 71. That is, there is the region Com between the outside of the region S of the signal lead-out line 71 and the inside of the region G of the scanning lead-out line 21, where the intersecting portion of the scanning lead-out line 21 and the signal lead-out line 71 does not exist. The common lead-out line 31 is disposed in the region Com.

In Embodiment 1, an essential portion of the common lead-out line 31 is configured from the second conductive film which is disposed in the same layer as the signal line 7 and the signal lead-out line 71.

Further, the scanning line 2 is configured to input a scanning signal alternatively from the right and left with respect to the display region D. With this configuration, both the even row and the odd row of the sub-capacitance line 3 which is made of the first conductive film in the same layer as the scanning line 2 are extended to the outside of the region S of the respective signal lead-out lines 71. The both rows of the sub-capacitance line 3 are connected to each other at the both ends of extension. Therefore, an island-shaped independent sub-capacitance line pad 3a is formed along the pattern shape of the common lead-out line 31. The reason the sub-capacitance line pad 3a is formed in the island shape is because there is the scanning lead-out line 21 made of the same layer.

In a general manufacturing method adopted with the 5-mask process, the contact hole is formed by simultaneously etching the gate insulating film 4 and the protective film 10 in the same process. Therefore, in order to connect the common lead-out line 31 and the sub-capacitance line pad 3a, it is necessary to connect both by using a connection film which is made of the same layer as the pixel electrode 12.

Here, a recess 31b is provided in a part of the common lead-out line 31 without the second conductive film which configures the common lead-out line 31. Further, the sub-common lead-out line 18, which becomes the connection film made from the same layer as the pixel electrode 12, is disposed on the upper layer of the common lead-out line 31 along the pattern shape of the common lead-out line 31.

The sub-common lead-out line 18 connects the common lead-out line 31 and the sub-capacitance line pad 3a via the contact hole 15 provided at the recess 31b of the common lead-out line 31 and the contact hole 16 provided on the common lead-out line 31.

As shown in the cross-sectional view of FIG. 5, the common lead-out line 31 is connected with the sub-capacitance line pad 3a by the sub-common lead-out line 18 via the contact hole 15 passing through the gate insulating film 4 and the protective film 10 provided at the recess 31b and the contact hole 16 passing through the protective film 10 provided on the common lead-out line 31.

The sub-common lead-out line 18 connects the common lead-out line 31 and the sub-capacitance line pad 3a. The sub-capacitance line pad 3a and the sub-common lead-out line 18 which become a sub-conductive film are disposed on the upper and lower layers of the common lead-out line 31 along the pattern of the common lead-out line 31, via the contact holes 15 and 16 to form a three-layered lamination structure. Therefore, a decrease of the resistance of the common lead-out line 31 is achieved.

Further, the sub-capacitance line pad 3a and the sub-common lead-out line 18 are also used as a bypass circuit when the common lead-out line 31 is disconnected. Therefore, it is possible to suppress a defective display due to the disconnection of the common lead-out line 31.

Further, the region Com, where the common lead-out line 31 is disposed, is disposed between the region G of the scanning lead-out line 21 and the region S of the signal lead-out line 71. Therefore, the common lead-out line 31 intersects any one of the scanning lead-out line 21 and the signal lead-out line 71, but does not intersect both of them.

Accordingly, comparing with the case where the common lead-out line 31 is also disposed in the intersection region F along the display region boundary 55 of the display region D in the non-quadrangle shape, the limitation on size of the contact holes 15 and 16 is small, and there is no need to provide a connection film (for example, the sub-common lead-out line 18 in the same layer as the pixel electrode 12) which is converted to other layer needed in the intersecting portion of the common lead-out line 31 and a lead-out line (in Embodiment 1, the signal lead-out line 71 formed as the second conductive film) in the same layer. Therefore, the number of the contact holes necessary for the conversion is also small, and the contact defect or the contact resistance increase also can be suppressed.

As described above, according to Embodiment 1, the dimension of the sub-capacitance line pad 3a in a vertical (column) direction can be set near to a longitudinal dimension of the two pixels 50. On the other hand, the dimension of the sub-capacitance line pad 3a in a horizontal (row) direction can be set separately from a lateral dimension of the pixel 50, and thus can be set to a dimension near to a width of the common lead-out line 31. Therefore, even though downsizing in the pixel 50 is advanced, the dimension of the contact hole 15 provided in the sub-capacitance line pad 3a and the dimension of the contact hole 16 provided on the common lead-out line 31 are able to be secured in a predetermined value, and thus effects of deviations in the contact resistance is able to be decreased. Further, since the common potential of the sub-capacitance line 3 (reference potential) can be held uniformly, the display variation due to the deviations in potential of the sub-capacitance line 3 can be decreased.

In addition, according to Embodiment 1, the common lead-out line 31 is configured such that the width of the common lead-out line 31 is widened in the frame region E separated from the mount region M and the connection terminal region N. Therefore, the low resistance can be maintained though a length of the common lead-out lie 31 becomes longer. In addition, regardless of the position of the pixel 50 in the display region D, the potential of the sub-capacitance line 3 is able to be held uniformly.

In addition, according to Embodiment 1, even though the region G of the scanning lead-out line 21 is disposed on the outside of the region S of the signal lead-out line 71, it is also possible that the region S of the signal lead-out line 71 is disposed on the outside of the region G of the scanning lead-out line 21 according to the position of the mount region M and the connection terminal region N. Further, the same effects can be obtained by disposing the common lead-out line 31 in the region Com between the mount region M and the connection terminal region N.

Embodiment 2

Figure 6:
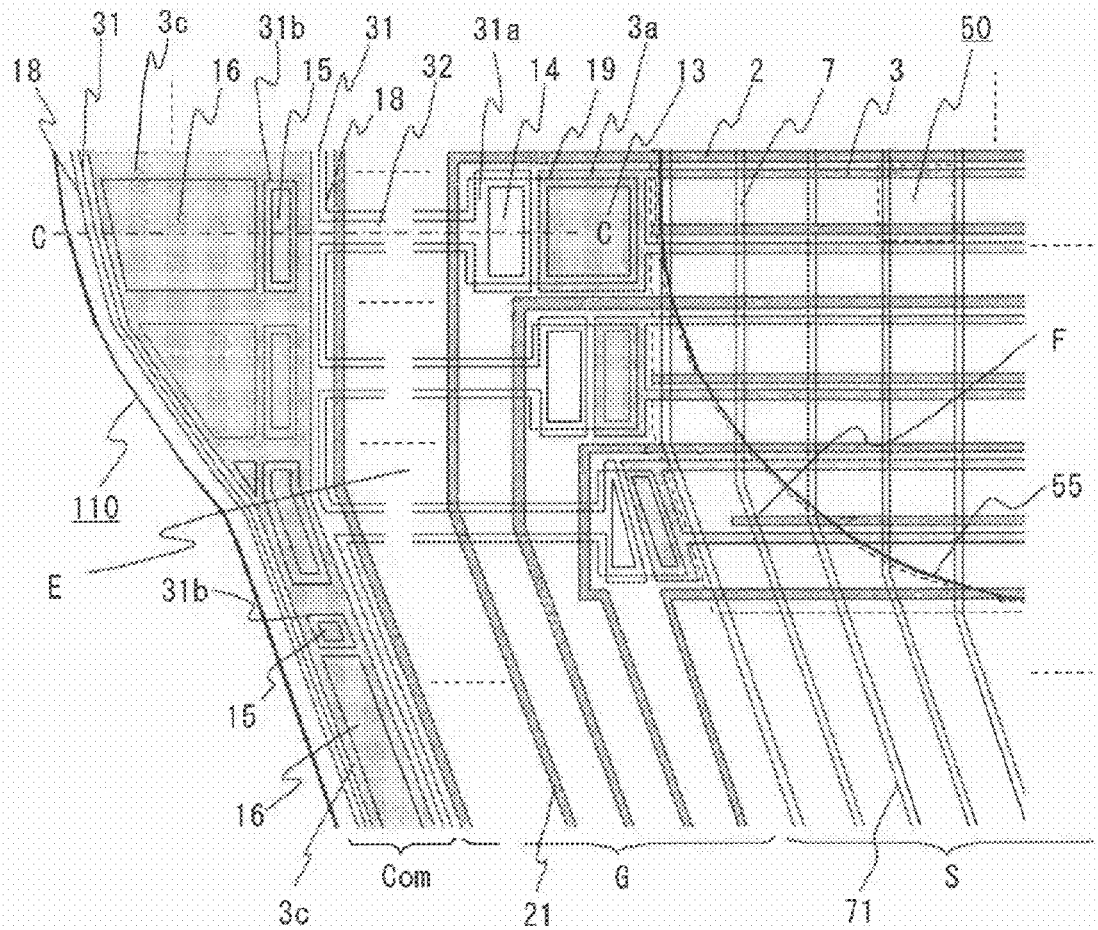
FIG. 6 is an enlarged plan view illustrating a frame region in an array substrate of a liquid crystal display device according to Embodiment 2 of the present invention.
Figure 7:
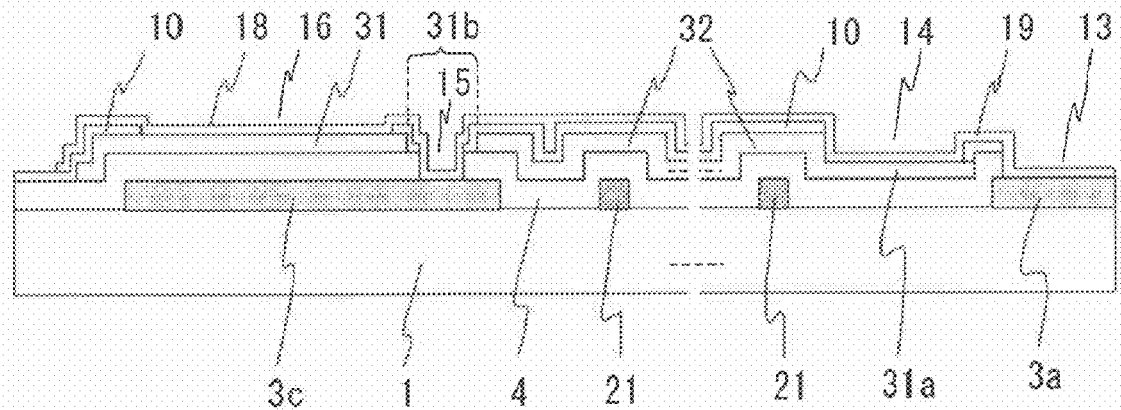
FIG. 7 is a cross-sectional view taken along line C-C of FIG. 6.

FIG. 6 is an enlarged plan view illustrating the frame region in the array substrate of the liquid crystal display device according to Embodiment 2 of the present invention. FIG. 7 is a cross-sectional view taken along line C-C of FIG. 6.

In Embodiment 1, the common lead-out line 31 bypassed the intersection region F and was disposed in the region Com between the region G of the scanning lead-out line 21 and the region S of the signal lead-out line 71. However, in Embodiment 2, as shown in FIG. 6, the common lead-out line 31 bypasses the intersection region F and the region Com is disposed at a position nearer to the end of the array substrate 110 than the region G of the scanning lead-out line 21 and the region S of the signal lead-out line 71. Therefore, the common lead-out line 31 is disposed not to intersect either the scanning lead-out line 21 or the signal lead-out line 71.

In Embodiment 2, in order to connect the sub-capacitance line 3 formed on the first conductive film of the same layer as the scanning line 2 with the common lead-out line 31 formed in the region Com near to the end of the array substrate 110, when the sub-capacitance line 3 is extended as it is in the frame region E, the sub-capacitance line 3 can intersect the signal lead-out line 71 formed on the second conductive film of another layer but the sub-capacitance line 3 cannot intersect the scanning lead-out line 21 of the same layer.

Here, the sub-capacitance line 3 is extended, and thus the sub-capacitance line pad 3a is provided on the outside of the region S of the signal lead-out line 71. The connection line 32 which is connected with the common lead-out line 31 is formed on the second conductive film of the same layer as the common lead-out line 31 or the same layer as the pixel electrode. Therefore, the connection line 32 can intersect the scanning lead-out line 21 via the gate insulating film 4 or the protective film 10, so that the sub-capacitance line 3 is connected with the common lead-out line 31.

FIG. 7 is a cross-sectional view taken along line C-C including the portion of the connection line 32 which connects the sub-capacitance line pad 3*a* with the common lead-out line 31 shown in FIG. 6. In Embodiment 2, the connection line 32 is formed at the portion where a portion of the common lead-out line 31 is extended to the display region D. The common lead-out line pad 31*a* is provided at the end of the connection line 32, and thus disposed adjacent to the sub-capacitance line pad 3*a*.

The connection line 32 is connected with the sub-capacitance line pad 3*a* by the conversion film 19, which is made of the same layer as the pixel electrode 12, via the contact hole 13 which passes through the gate insulating film 4 and the protective film 10 provided on the sub-capacitance line pad 3*a* and via the contact hole 14 which passes through the protective film 10 provided on the common lead-out line pad 31*a*.

Further, similar to Embodiment 1, the essential portion of the common lead-out line 31 is configured as the three-layered lamination structure in which the sub-common lead-out line 3*c* and the sub-common lead-out line 18 formed as the sub-conductive film are provided as the second conductive film on the upper and lower layers of the common lead-out line 31. With this configuration, the decrease of the resistance of the common lead-out line 31 is achieved. In addition, the sub-common lead-out line 3*c* and the sub-common lead-out line 18 are also used as a bypass circuit when the common lead-out line 31 is disconnected. Therefore, it is possible to suppress a defective display due to the disconnection of the common lead-out line 31.

Further, in Embodiment 1, the sub-capacitance line pad 3*a*, which is made of the first conductive film disposed below the common lead-out line 31, is separated and disposed in the island shape because there is the scanning signal lead-out line 21. However, in Embodiment 2, the sub-capacitance line pad 3*a* is not necessary to be separated and formed in the island shape, thereby being disposed as the sub-common lead-out line 3*c* which has a continuous pattern along the common lead-out line 31.

Further, the sub-common lead-out line 18, which is made of the same layer as the pixel electrode 12, is a continuous pattern along the common lead-out line 31. A portion of the sub-common lead-out line 18 is also formed on the pattern of the connection line 32, extending together with the connection line 32, so as to be connected to a conversion film 19 as it is. Therefore, the sub-common lead-out line 18 is also used as a bypass circuit when the connection line 32 is disconnected.

As described above, the common lead-out line 31 in Embodiment 2 is substantially configured as the three-layered lamination structure in which the second conductive film of the essential portion, the sub-common lead-out line 3*c* made of the first conductive film which is continuously formed instead of the island shape, and the sub-common lead-out line 18 made of the same layer as the pixel electrode are provided. Since wiring resistance to the sub-capacitance line 3 is able to be decreased more than that in Embodiment 1, the display variation due to the deviation in the common potential of the sub-capacitance line 3 can be further decreased. In addition, it is possible to suppress a defective display due to the disconnection of the common lead-out line 31.

Embodiment 3

Figure 8:
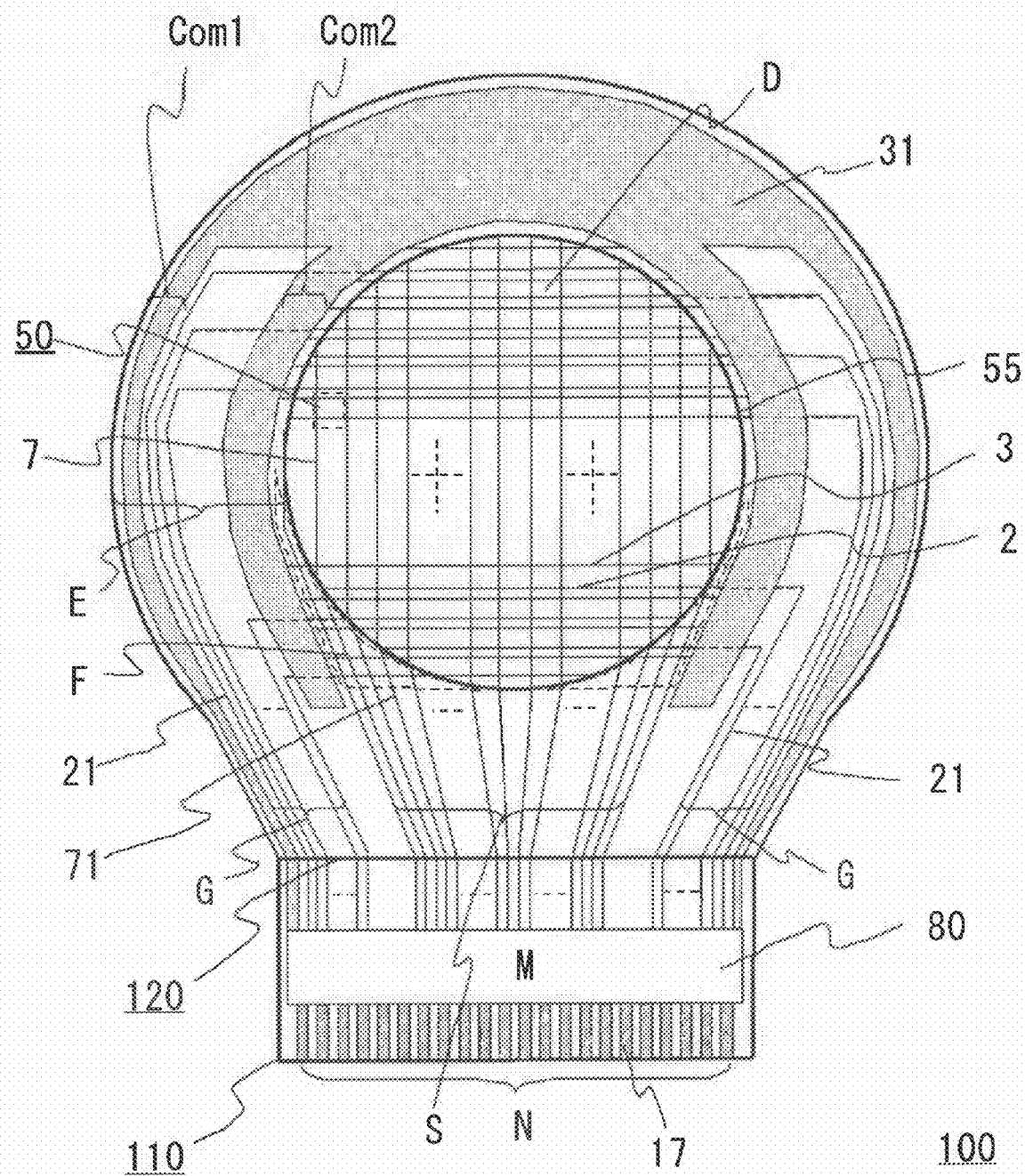
FIG. 8 is a plan view schematically illustrating a configuration of a display device according to Embodiment 3 of the present invention.

FIG. 8 is a plan view schematically illustrating a configuration of a display device according to Embodiment 3 of the present invention. Similar to Embodiment 2, the common lead-out line 31 extending from a driver IC which is a driving circuit 80 is disposed in a region Com1 in the frame region E close to the end of the array substrate 110, where the region Com1 does not intersect the both the scanning lead-out line 21 and the signal lead-out line 71. Further, similar to Embodiment 1, the common lead-out line 31 is disposed in a region Com2 between the region G of the scanning lead-out line 21 and the region S of the signal lead-out line 71, where the region Com2 is formed in a region which is turned back and extended from the frame region E opposite to the driving circuit 80 with respect to the display region D toward the driving circuit 80.

The reason for such configuration is that since an output terminal applying the common potential (reference potential) is located at the end portion of the driver IC in accordance with a specification of the driver IC configuring the driving circuit 80, as described in Embodiment 1, the region Com of the common lead-out line 31 between the region G of the scanning lead-out signal line 21 and the region S of the signal lead-out line 71 may not be disposed in some cases.

Embodiment 3 is advantageous for the case where the output terminal applying the common potential (reference potential) is located at the both ends of the driver IC. In this way, in accordance with the specification on the terminal of the driver IC configuring the driving circuit 80, the layout of the common lead-out line 31 may be appropriately selected by combining Embodiments 1 and 2.

Embodiments 1 to 3 illustrate the case where the even one and the odd one of the scanning lines 2 are alternatively inputted from the right and left of the display region D. However, the present invention is not limited thereto, and it is also possible to be applied to a configuration in which the scanning signals are inputted from one side. In this case, the common lead-out line 31 is disposed at the frame region E where the scanning lead-out line 21 is disposed. Further, it is also possible to be applied to a configuration in which the input portion of the scanning signals are changed in an upper half and a lower half of the display region D.

In Embodiments 1 to 3, for the display device 100, a liquid crystal display device has been described as an example. However, the present invention is not limited to the liquid crystal 90 as a display medium as long as an array substrate has the common lead-out line 31. Therefore, it is also possible to be applied to a display device using a display medium, such as very small globule, fine powder, oil droplet, and other display mediums which are used for a display device called an electronic paper and an organic or inorganic electroluminescence film.

What is claimed is:
1. An array substrate comprising:
   a pixel that is provided on the array substrate, the pixel comprising:
      a scanning line;
      a signal line that intersects the scanning line;
      a thin film transistor that is connected to the scanning line and the signal line in a region surrounded by the scanning line and the signal line;

a pixel electrode that is connected to the thin film transistor; and
a sub-capacitance line that forms a sub-capacitance,
wherein a display region, where a plurality of the pixels is disposed in a matrix-like shape, has a non-quadrangle shape,
wherein a frame region on the outside of a display region comprises:
a scanning lead-out line connected to the scanning line;
a signal lead-out line connected to the signal line; and
a common lead-out line that connects the sub-capacitance line in common to a side of a frame region where the scanning lead-out line is disposed,
wherein the frame region comprises an intersection region of the scanning lead-out line and the signal lead-out line, and
wherein the common lead-out line is disposed in a region between a region of the scanning lead-out line and a region of the signal lead-out line while intersecting any one of the scanning lead-out line and the signal lead-out line, whereas the common lead-out line is not disposed in the intersecting region.

2. The array substrate according to claim 1,
wherein the common lead-out line is configured as a lamination structure, in which the common lead-out line is connected with a sub-common lead-out line via a contact hole, the sub-common lead-out line being made of the same layer as the pixel electrode.

3. A display device comprising:
an array substrate comprising:
a pixel that is provided on the array substrate, the pixel comprising:
a scanning line;
a signal line that intersects the scanning line;
a thin film transistor that is connected to the scanning line and the signal line in a region surrounded by the scanning line and the signal line;
a pixel electrode that is connected to the thin film transistor; and
a sub-capacitance line that forms a sub-capacitance,
wherein a display region, where a plurality of the pixels is disposed in a matrix-like shape, has a non-quadrangle shape,
wherein a frame region on the outside of a display region comprises:
a scanning lead-out line connected to the scanning line;
a signal lead-out line connected to the signal line; and
a common lead-out line that connects the sub-capacitance line in common to a side of a frame region where the scanning lead-out line is disposed,
wherein the frame region comprises an intersection region of the scanning lead-out line and the signal lead-out line, and
wherein the common lead-out line is disposed in a region between a region of the scanning lead-out line and a region of the signal lead-out line while intersecting any one of the scanning lead-out line and the signal lead-out line, whereas the common lead-out line is not disposed in the intersecting region; and
a display medium which is combined with the array substrate.

* * * * *